United States Patent [19]

Terashima et al.

[11] Patent Number: 4,882,083
[45] Date of Patent: Nov. 21, 1989

[54] SMECTIC LIQUID CRYSTAL MIXTURE

[75] Inventors: Kanetsugu Terashima; Mitsuyoshi Ichihashi; Fusayuki Takeshita, all of Ichiharashi; Makoto Kikuchi, Kisarazushi; Kenji Furukawa, Yokosukashi, all of Japan

[73] Assignee: Chisso Corporation, Japan

[21] Appl. No.: 200,016

[22] Filed: May 27, 1988

[30] Foreign Application Priority Data

Jun. 1, 1987 [JP] Japan .................. 62-137883

[51] Int. Cl.$^4$ .................. C09K 19/34; G02F 1/13
[52] U.S. Cl. .................. 252/299.61; 252/299.65; 252/299.66; 252/299.67; 350/350 S
[58] Field of Search .................. 252/299.61, 299.01; 350/350 S

[56] References Cited

U.S. PATENT DOCUMENTS 4,725,688  2/1988  Taguchi et al. .................. 252/299.61
4,780,241 10/1988  Furukawa et al. .................. 252/299.01

FOREIGN PATENT DOCUMENTS 206228   12/1986  European Pat. Off. .................. 252/299.61
2257588   6/1973  Fed. Rep. of Germany .................. 252/299.61
59-199786 11/1984  Japan .................. 252/299.61
86/06401 11/1986  World Int. Prop. O. .................. 252/299.61

OTHER PUBLICATIONS

Demus, D., et al., Flussige Kristalle in Tabellen II, Veb Deutscher Verlag Fur Grundstoffindustrie, Leipzig, pp. 377 (1984).

Primary Examiner—Teddy S. Gron
Attorney, Agent, or Firm—Leydig, Voit & Mayer

[57] ABSTRACT

A smectic C liquid crystal mixture having a broad smectic C phase temperature range including room temperature, a ferroelectric smectic C liquid crystal mixture having a large spontaneous polarization, comprising the above smectic C mixture and at least one optically active compound, and a liquid crystal display element having an improved response time, containing the above ferroelectric smectic C liquid crystal mixture are provided, which smectic C liquid crystal mixture comprises (1) at least two components at least one of which is a pyrimidine compound expressed by the formula

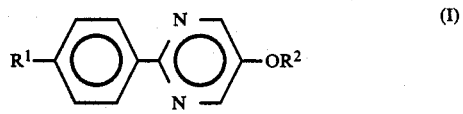

wherein $R^1$ represents a linear alkyl group of 4 to 20 carbon atoms and $R^2$ represents a linear alkyl group having 7-20 carbons and having a smectic C phase;

(2) at least one pyrimidine compound of the formula (I) and at least one pyrimidine compound expressed by the formula

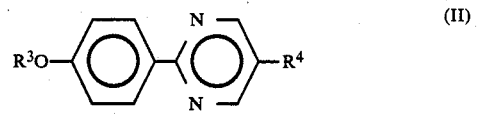

wherein $R^3$ represents a linear alkyl group of 6 to 12 carbon atoms and $R^4$ represents a linear alkyl group having 8 to 11 carbons and having a smectic C phase; or (3) at least one pyrimidine compound of the formula (I) and at least one biphenylpyrimidine compound expressed by the formula

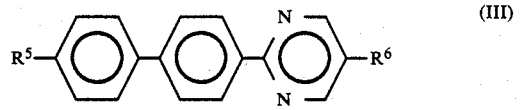

wherein $R^5$ and $R^6$ each are a linear alkyl or alkoxy group each having 1-18 carbons.

15 Claims, No Drawings

SMECTIC LIQUID CRYSTAL MIXTURE

BACKGROUND OF THE INVENTION

1. Field of the Invention

This invention relates to a ferroelectric liquid crystal material. More particularly it relates to a ferroelectric smectic liquid crystal material comprising a novel smectic liquid crystal compound and an optically active compound suitable for high-speed response liquid crystal display devices.

2. Description of the Related Art

At present, the TN (Twisted Nematic) display mode has been broadly employed for liquid crystal display elements. This TN display mode has a number of advantages such as low driving voltage, small power consumption, etc., but it is still inferior in the aspect of the response rate to emissive display elements such as cathode ray tubes, electroluminescence displays, plasma displays, etc. A novel TN display element having a twist angle elevated to 180° to 270° has also been developed, but its response rate is still inferior. Efforts for various improvements have been made as described above, but a TN mode display element having a high response rate has not yet been realized. However, in the case of a novel display mode using a ferroelectric liquid crystal the research of which mode has recently been extensively made, there is a possibility of notable improvement in the response rate (see Clark et al, Applied Phys. Lett., 36, 899 (1980)). This mode utilizes chiral smectic phases exhibiting ferroelectric properties such as chiral smectic C phase (hereinafter abbreviated to SC*). It has been known that phases exhibiting ferroelectric properties are not only limited to SC* phase, but also include phases of chiral smectic F, G, H, I, etc.

Various specific features have been required for ferroelectric liquid crystal materials used for ferroelectric liquid crystal display elements practically used, but at present, there is no single compound which satisfies such requirements; hence it is necessary to use ferroelectric liquid crystal compositions obtained by blending some liquid crystal compounds and/or non-liquid-crystalline compounds.

Further, not only have ferroelectric liquid crystal compositions composed only of ferroelectric liquid crystal compounds been reported, but also it has been reported in Japanese patent application laid-open No. Sho 61-195187/1986 that when one or more kinds of compounds exhibiting ferroelectric liquid crystal phases are blended with compounds or compositions exhibiting achiral smectic C, F, G, H, I phase or the like (hereinafter abbreviated to SC phase or the like) as base substances, the resulting blend can constitute a ferroelectric liquid crystal composition as a whole.

Further, it has also been reported that using a compound or a composition containing the compound each exhibiting $S_c$ phase or the like as a base substance, at least one compound which is optically active but exhibits no ferroelectric liquid crystal phase is mixed with the above compound or composition to constitute a ferroelectric liquid crystal composition as a whole (see Mol. Cryst. Liq. Cryst. 89, 327 (1982)).

In a brief summary of these facts, it is seen that when one or more kinds of optically active compounds are blended with base substances, the resulting blend can constitute a ferroelectric liquid crystal composition irrespective of whether or not the optically active compounds exhibit ferroelectric liquid crystal phases.

A smectic liquid crystal mixture which comprises a base substance exhibiting at least one achiral smectic phase and also has at least one achiral smectic phase will hereinafter be referred to as "smectic base mixture". Such a smectic base mixture is practically preferred to be a liquid crystal mixture exhibiting an SC phase over a broad temperature range including room temperature. As the component of the smectic base mixture, some compounds selected from among liquid crystal compounds of phenylbenzoates, Schiff's bases, biphenyls, phenyl-pyridines, 5-alkyl-2-(4-alkoxyphenyl)pyridines, etc. have been used.

For example, Japanese patent application laid-open No. Sho 61-291679/1986 and the international publication WO 86/06401 disclose a ferroelectric liquid crystal having a 5-alkyl-2-(4-alkoxyphenyl)pyrimidine blended with an optically active compound, and also the former reference discloses that when a ferroelectric smectic liquid crystal material comprising the above pyrimidine derivative as a smectic base mixture is used, it is possible to shorten the response time of light-switching elements. Further the former reference also discloses that a ferroelectric liquid crystal material comprising a 5-alkyl-2-(4'-alkylbiphenylyl-4)pyrimidine, the above 5-alkyl-2-(4-alkoxyphenyl)pyrimidine and an optically active compound is effective for improving the response properties.

However, as compared with other type display elements such as emissive mode displays, a further improvement in the response properties has been required for the liquid crystal display.

SUMMARY OF THE INVENTION

As apparent from the foregoing, a first object of the present invention is to provide a ferroelectric smectic liquid crystal material capable of realizing high-speed response properties. A second object of the present invention is to provide a smectic base mixture useful as a component of the ferroelectric smectic liquid crystal material. Still another object of the present invention is to provide a light-switching element effecting a high-speed response.

The present inventors have made extensive research in order to further improve the invention disclosed in the above Japanese patent application laid-open No. Sho 61-291679/1986. As a result, we have found a smectic liquid crystal component capable of notably improving the response properties of display elements using ferroelectric liquid crystal materials and have completed the present invention. Namely the above-mentioned second object of the present invention can be achieved by (1) a smectic C liquid crystal mixture comprising at least two components at least one of which is a 5-alkoxy-2-(4-alkylphenyl)pyrimidine expressed by the formula

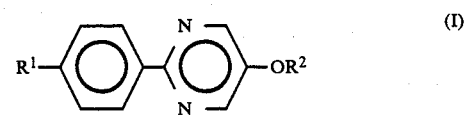

wherein $R^1$ represents a linear alkyl group of 4 to 20 carbon atoms and $R^2$ represents a linear alkyl group of 7 to 20 carbon atoms; and having a smectic C phase;

(2) a smectic C liquid crystal mixture comprising at least one member of 5-alkoxy-2-(4-alkylphenyl)pyrimidines set forth in the above item (1) and at least one member of 5-alkyl-2-(4-alkoxyphenyl)pyrimidines expressed by the formula

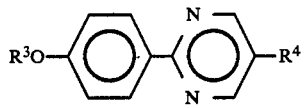
(II)

wherein $R^3$ represents a linear alkyl group of 6 to 12 carbon atoms and $R^4$ represents a linear alkyl group of 8 to 11 to carbon atoms and having a smectic C phase; or (3) a smectic C liquid crystal mixture comprising at least one member of 5-alkoxy-2-(4-alkylphenyl)pyrimidines set forth in the above item (1) and at least one member of biphenylpyrimidines expressed by the formula

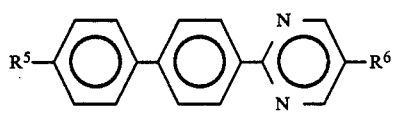
(III)

wherein $R^5$ and $R^6$ each represent the same or different linear alkyl group or alkoxy group each of 1 to 18 carbon atoms.

The first object of the present invention is achieved by a ferroelectric smectic liquid crystal mixture obtained by blending an optically active compound with a smectic liquid crystal mixture set forth in the above item (1), (2) or (3).

Further, when the thus obtained ferroelectric liquid crystal mixture is used, it is possible to realize a liquid crystal display element effecting a high-speed response.

DETAILED DESCRIPTION OF PREFERRED EMBODIMENTS

As the smectic liquid crystal mixture set forth in the above item (1), those having smectic C phase are particularly preferred. As the component of the mixture, among 5-alkoxy-2-(4-alkylphenyl)pyrimidine compounds expressed by the formula (I), those having smectic C phase are preferably used. As these compounds having smectic C phase, pyrimidine derivatives of the formula (I) wherein $R^1$ represents a linear alkyl group of 4 to 20 carbon atoms and $R^2$ represents a linear alkyl group of 7 to 20 carbon atoms may be exemplified. In the present invention, it is preferred to use a plurality of members of these pyrimidine derivatives. Examples of these pyrimidine derivatives are as follows:

5-heptyloxy-2-(4-butylphenyl)pyrimidine
5-heptyloxy-2-(4-pentylphenyl)pyrimidine
5-heptyloxy-2-(4-hexylphenyl)pyrimidine

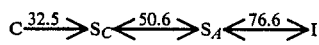

5-heptyloxy-2-(4-heptylphenyl)pyrimidine

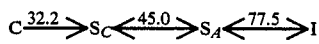

5-heptyloxy-2-(4-octylphenyl)pyrimidine

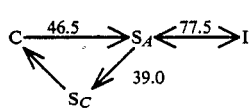

5-heptyloxy-2-(4-nonylphenyl)pyrimidine
5-heptyloxy-2-(4-decylphenyl)pyrimidine
5-heptyloxy-2-(4-undecylphenyl)pyrimidine
5-heptyloxy-2-(4-dodecylphenyl)pyrimidine
5-heptyloxy-2-(4-tridecylphenyl)pyrimidine
5-heptyloxy-2-(4-tetradecylphenyl)pyrimidine
5-octyloxy-2-(4-butylphenyl)pyrimidine
5-octyloxy-2-(4-pentylphenyl)pyrimidine
5-octyloxy-2-(4-hexylphenyl)pyrimidine

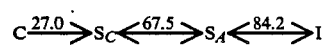

5-octyloxy-2-(4-heptylphenyl)pyrimidine

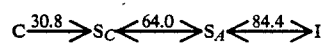

5-octyloxy-2-(4-octylphenyl)pyrimidine

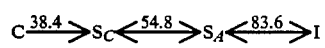

5-octyloxy-2-(4-nonylphenyl)pyrimidine

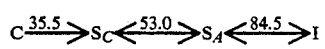

5-octyloxy-2-(4-decylphenyl)pyrimidine

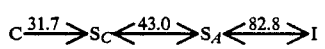

5-octyloxy-2-(4-undecylphenyl)pyrimidine
5-octyloxy-2-(4-dodecylphenyl)pyrimidine
5-octyloxy-2-(4-tridecylphenyl)pyrimidine
5-octyloxy-2-(4-tetradecylphenyl)pyrimidine
5-nonyloxy-2-(4-butylphenyl)pyrimidine
5-nonyloxy-2-(4-pentylphenyl)pyrimidine
5-nonyloxy-2-(4-hexylphenyl)pyrimdine

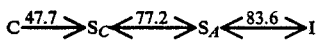

5-nonyloxy-2-(4-heptylphenyl)pyrimidine

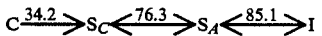

5-nonyloxy-2-(4-octylphenyl)pyrimidine

5-nonyloxy-2-(4-nonylphenyl)pyrimidine

5-nonyloxy-2-(4-decylphenyl)pyrimidine $$C \xrightarrow{46.6} S_C \xleftarrow{71.4} S_A \xleftarrow{83.8} I$$

5-nonyloxy-2-(4-undecylphenyl)pyrimidine
5-nonyloxy-2-(4-dodecylphenyl)pyrimidine
5-nonyloxy-2-(4-tridecylphenyl)pyrimidine
5-nonyloxy-2-(4-tetradecylphenyl)pyrimidine
5-decyloxy-2-(4-butylphenyl)pyrimidine
5-decyloxy-2-(4-pentylphenyl)pyrimidine
5-decyloxy-2-(4-hexylphenyl)pyrimidine $$C \xrightarrow{38.1} S_C \xleftarrow{82.4} S_A \xleftarrow{86.5} I$$
$$\searrow\swarrow 35.2$$
$$S_X$$

5-decyloxy-2-(4-heptylphenyl)pyrimidine $$C \xrightarrow{32.2} S_X \xleftarrow{33.0} S_C \xleftarrow{83.1} S_A \xleftarrow{87.7} I$$

5-decyloxy-2-(4-octylphenyl)pyrimidine $$C \xrightarrow{41.9} S_C \xleftarrow{83.8} S_A \xleftarrow{88.4} I$$

5-decyloxy-2-(4-nonylphenyl)pyrimidine $$C \xrightarrow{37.0} S_C \xleftarrow{83.0} S_A \xleftarrow{87.7} I$$
$$\searrow\swarrow 31.7$$
$$S_X$$

5-decyloxy-2-(4-decylphenyl)pyrimidine $$C \xrightarrow{42.0} S_C \xleftarrow{80.9} S_A \xleftarrow{87.0} I$$

5-decyloxy-2-(4-undecylphenyl)pyrimidine
5-decyloxy-2-(4-dodecylphenyl)pyrimidine
5-decyloxy-2-(4-tridecylphenyl)pyrimidine
5-decyloxy-2-(4-tetradecylphenyl)pyrimidine
5-undecyloxy-2-(4-butylphenyl)pyrimidine
5-undecyloxy-2-(4-pentylphenyl)pyrimidine
5-undecyloxy-2-(4-hexylphenyl)pyrimidine $$C \xrightarrow{42.0} S_X \xleftarrow{42.3} S_C \xleftarrow{84.3} S_A \xleftarrow{86.4} I$$

5-undecyloxy-2-(4-heptylphenyl)pyrimidine $$C \xrightarrow{38.7} S_X \xleftarrow{45.2} S_C \xleftarrow{86.8} S_A \xleftarrow{88.6} I$$

5-undecyloxy-2-(4-octylphenyl)pyrimidine $$C \xrightarrow{54.3} S_C \xleftarrow{87.2} I$$

5-undecyloxy-2-(4-nonylphenyl)pyrimidine $$C \xrightarrow{45.0} S_X \xleftarrow{46.0} S_C \xleftarrow{87.0} I$$

5-undecyloxy-2-(4-decylphenyl)pyrimidine $$C \xrightarrow{51.4} S_C \xleftarrow{86.5} I$$
$$\searrow\swarrow 47.0$$
$$S_X$$

5-undecyloxy-2-(4-undecylphenyl)pyrimidine
5-undecyloxy-2-(4-dodecylphenyl)pyrimidine
5-undecyloxy-2-(4-tridecylphenyl)pyrimidine
5-undecyloxy-2-(4-tetradecylphenyl)pyrimidine
5-dodecyloxy-2-(4-butylphenyl)pyrimidine
5-dodecyloxy-2-(4-pentylphenyl)pyrimidine
5-dodecyloxy-2-(4-hexylphenyl)pyrimidine $$C \xrightarrow{35.0} S_X \xleftarrow{47.4} S_C \xleftarrow{85.6} S_A \xleftarrow{87.1} I$$

5-dodecyloxy-2-(4-heptylphenyl)pyrimidine $$C \xrightarrow{45.8} S_X \xleftarrow{54.2} S_C \xleftarrow{88.6} S_A \xleftarrow{89.3} I$$

5-dodecyloxy-2-(4-octylphenyl)pyrimidine $$C \xrightarrow{57.3} S_X \xleftarrow{57.8} S_C \xleftarrow{88.7} I$$

5-dodecyloxy-2-(4-nonylphenyl)pyrimidine $$C \xrightarrow{46.5} S_X \xleftarrow{59.0} S_C \xleftarrow{88.9} I$$

5-dodecyloxy-2-(4-decylphenyl)pyrimidine $$C \xrightarrow{51.7} S_X \xleftarrow{59.4} S_C \xleftarrow{88.2} I$$

5-dodecyloxy-2-(4-undecylphenyl)pyrimidine
5-dodecyloxy-2-(4-dodecylphenyl)pyrimidine
5-dodecyloxy-2-(4-tridecylphenyl)pyrimidine
5-dodecyloxy-2-(4-tetradecylphenyl)pyrimidine
5-tridecyloxy-2-(4-butylphenyl)pyrimidine
5-tridecyloxy-2-(4-pentylphenyl)pyrimidine
5-tridecyloxy-2-(4-hexylphenyl)pyrimidine $$C \xrightarrow{41.7} S_X \xleftarrow{48.0} S_C \xleftarrow{82.7} S_A \xleftarrow{84.8} I$$

5-tridecyloxy-2-(4-heptylphenyl)pyrimidine
5-tridecyloxy-2-(4-octylphenyl)pyrimidine $$C \xrightarrow{56.6} S_X \xleftarrow{62.2} S_C \xleftarrow{88.2} I$$

5-tridecyloxy-2-(4-nonylphenyl)pyrimidine $$C \xrightarrow{52.0} S_X \xleftarrow{65.3} S_C \xleftarrow{88.0} I$$

5-tridecyloxy-2-(4-decylphenyl)pyrimidine
5-tridecyloxy-2-(4-undecylphenyl)pyrimidine
5-tridecyloxy-2-(4-dodecylphenyl)pyrimidine
5-tridecyloxy-2-(4-tridecylphenyl)pyrimidine
5-tridecyloxy-2-(4-tetradecylphenyl)pyrimidine
5-tetradecyloxy-2-(4-butylphenyl)pyrimidine
5-tetradecyloxy-2-(4-pentylphenyl)pyrimidine
5-tetradecyloxy-2-(4-hexylphenyl)pyrimidine

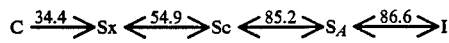

5-tetradecyloxy-2-(4-heptylphenyl)pyrimidine
5-tetradecyloxy-2-(4-octylphenyl)pyrimidine

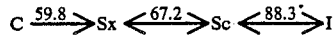

5-tetradecyloxy-2-(4-nonylphenyl)pyrimidine
5-tetradecyloxy-2-(4-decylphenyl)pyrimidine
5-tetradecyloxy-2-(4-undecylphenyl)pyrimidine
5-teteadecyloxy-2-(4-dodecylphenyl)pyrimidine
5-tetradecyloxy-2-(4-tridecylphenyl)pyrimidine
5-tetradecyloxy-2-(4-tetradecylphenyl)pyrimidine
5-pentadecyloxy-2-(4-butylphenyl)pyrimidine
5-pentadecyloxy-2-(4-pentylphenyl)pyrimidine
5-pentadecyloxy-2-(4-hexylphenyl)pyrimidine

5-pentadecyloxy-2-(4-heptylphenyl)pyrimidine
5-pentadecyloxy-2-(4-octylphenyl)pyrimidine

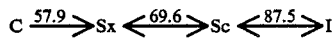

5-pentadecyloxy-2-(4-nonylphenyl)pyrimidine
5-pentadecyloxy-2-(4-decylphenyl)pyrimidine
5-pentadecyloxy-2-(4-undecylphenyl)pyrimidine
5-pentadecyloxy-2-(4-dodecylphenyl)pyrimidine
5-pentadecyloxy-2-(4-tridecylphenyl)pyrimidine
5-pentadecyloxy-2-(4-tetradecylphenyl)pyrimidine In the above-listed compounds, C, Sc, $S_A$ and I represent crystalline phase, smectic C phase, smectic A phase and isotropic liquid phase, respectively; Sx represents an unidentified smectic phase other than Sc phase, the liquid crystal molecule being tilted at the Sx phase; and numerals represent phase transition points (° C.).

In the preparation of the smectic liquid crystal mixture of the present invention, a plurality of only compounds expressed by the formula (I) and having the Sc phase illustrated above may be combined together, but it is also possible to combine at least one of the above compounds with at least one of known liquid crystal compounds within a range wherein the object of the present invention is not damaged. As a superior smectic base mixture obtained in combination with the smectic liquid crystal compound of the formual (I) or a mixture thereof, the smectic liquid crystal mixtures described in the above items (2) and (3) may be illustrated.

As the 5-alkyl-2-(4-alkoxyphenyl)pyrimidine compound of the above item (2), compounds of the formula (II) wherein $R^3$ represents a linear alkyl group of 6 to 12 carbon atoms and $R^4$ represents a linear alkyl group of 8 to 11 carbon atoms and having Sc phase are particularly preferred. Such preferred compounds and the phase transition states thereof are illustrated below.

5-octyl-2-(4-hexyloxyphenyl)pyrimidine

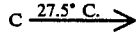

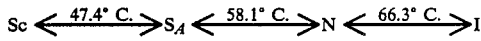

5-nonyl-2-(4-hexyloxyphenyl)pyrimidine

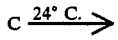

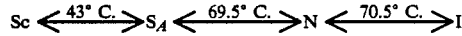

5-decyl-2-(4-hexyloxyphenyl)pyrimidine

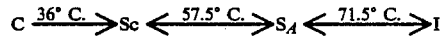

5-nonyl-2-(4-heptyloxyphenyl)pyrimidine

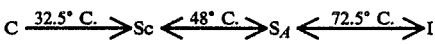

5-decyl-2-(4-heptyloxyphenyl)pyrimidine

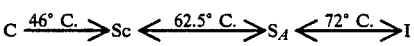

5-octyl-2-(4-octyloxyphenyl)pyrimidine

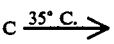

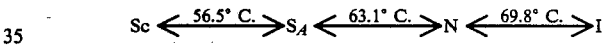

5-nonyl-2-(4-octyloxyphenyl)pyrimidine

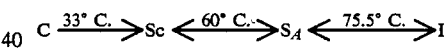

5-decyl-2-(4-octyloxyphenyl)pyrimidine

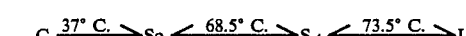

5-heptyl-2-(4-nonyloxyphenyl)pyrimidine

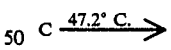

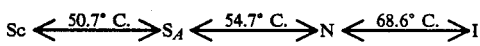

5-octyl-2-(4-nonyloxyphenyl)pyrimidine

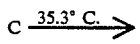

5-octyl-2-(4-decyloxyphenyl)pyrimidine

5-heptyl-2-(4-undecyloxyphenyl)pyrimidine

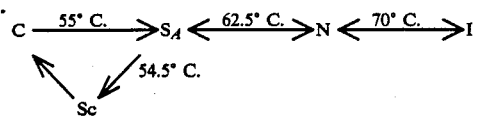

5-octyl-2-(4-undecyloxyphenyl)pyrimidine

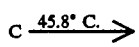

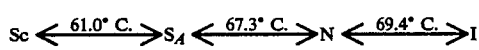

5-heptyl-2-(4-dodecyloxyphenyl)pyrimidine

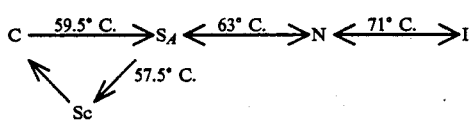

5-octyl-2-(4-dodecyloxyphenyl)pyrimidine

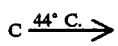

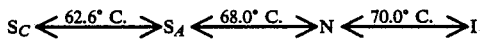

As the biphenylpyrimidine compounds described in the above item (3), biphenylpyrimidine compounds of the formula (III) wherein $R^5$ represents a linear alkyl group or alkoxy group each of 5 to 10 carbon atoms and $R^6$ represents a linear alkyl group or alkoxy group each of 5 to 10 carbon atoms and having smectic C phase are preferred. Examples of these compounds are as follows:

5-hexyl-2-(4'-pentylbiphenylyl-4)pyrimidine

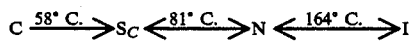

5-heptyl-2-(4'-pentylbiphenylyl-4)pyrimidine

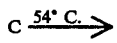

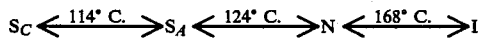

5-octyl-2-(4'-pentylbiphenylyl-4)pyrimidine

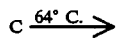

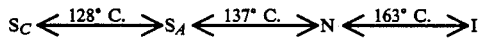

5-hexyl-2-(4'-hexylbiphenylyl-4)pyrimidine

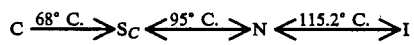

5-heptyl-2-(4'-hexylbiphenylyl-4)pyrimidine

C $\xrightarrow{72°\ C.}$

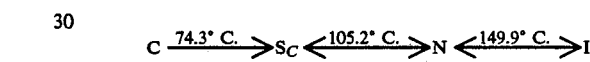

5-octyl-2-(4'-hexylbiphenylyl-4)pyrimidine

C $\xrightarrow{65.6°\ C.}$

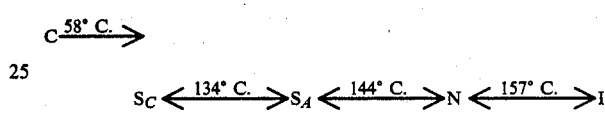

5-hexyl-2-(4'-heptylbiphenylyl-4)pyrimidine

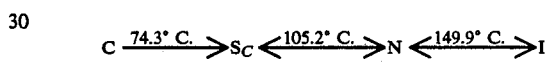

5-heptyl-2-(4'-heptylbiphenylyl-4)pyrimidine
5-octyl-2-(4'-heptylbiphenylyl-4)pyrimidine C $\xrightarrow{58°\ C.}$

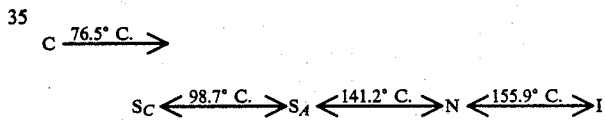

5-hexyl-2-(4'-octylbiphenylyl-4)pyrimidine

5-heptyl-2-(4'-octylbiphenylyl-4)pyrimidine

C $\xrightarrow{76.5°\ C.}$

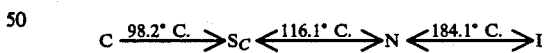

5-octyl-2-(4'-octylbiphenylyl-4)pyrimidine

C $\xrightarrow{72.3°\ C.}$

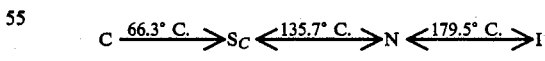

5-hexyl-2-(4'-pentyloxybiphenylyl-4)pyrimidine

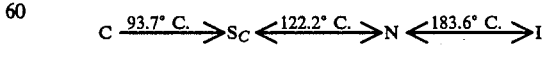

5-octyl-2-(4'-pentyloxybiphenylyl-4)pyrimidine

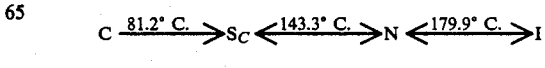

5-hexyl-2-(4'-hexyloxybiphenylyl-4)pyrimidine

C $\xrightarrow{93.7°\ C.}$ $S_C$ $\xrightarrow{122.2°\ C.}$ N $\xrightarrow{183.6°\ C.}$ I 5-octyl-2-(4'-hexyloxybiphenylyl-4)pyrimidine C $\xrightarrow{81.2°\ C.}$ $S_C$ $\xrightarrow{143.3°\ C.}$ N $\xrightarrow{179.9°\ C.}$ I 5-hexyl-2-(4'-heptyloxybiphenylyl-4)pyrimidine

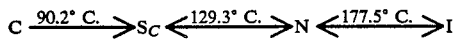

5-octyl-2-(4'-heptyloxybiphenylyl-4)pyrimidine

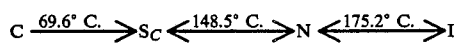

5-hexyl-2-(4'-octyloxybiphenylyl-4)pyrimidine

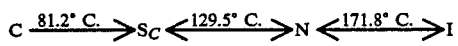

5-octyl-2-(4'-octyloxybiphenylyl-4)pyrimidine

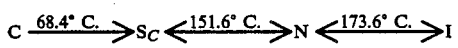

5-octyloxy-2-(4'-hexylbiphenylyl-4)pyrimidine

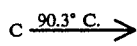

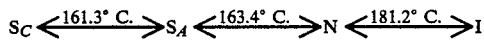

As the pyrimidine compounds used as a component of the smectic liquid crystal mixture of the present invention and expressed by the formula (II) or (III), those having Sc phase are preferred as described, but even those exhibiting no Sc phase may be used only in a quantity in the range wherein the Sc phase temperature range of the resulting smectic base mixture is not notably narrowed. This applies to compounds expressed by the formula (I) but exhibiting no Sc phase, and such compounds may be used as a component of the mixture for viscosity reduction or for adjusting the Sc phase temperature range.

Besides the already mentioned liquid crystalline compounds, as compounds used in combination with the smectic liquid crystal compound of the formula (I) or mixtures thereof, there are illustrated liquid crystal compounds abundant in smectic C properties such as biphenylylbenzoates, phenylcyclohexanes, azo compounds, azoxy compounds, phenylpyridines, 2,5-diphenylpyrimidines, etc.

The optically active substances used as a component of the present invention have no particular limitation as far as they are soluble in the resulting smectic base mixture at its Sc phase, and among these substances, the following compounds are illustrated: compounds having (i) the following groups at an optically active site:

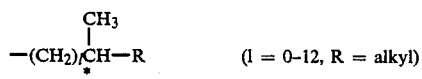  (l = 0–12, R = alkyl)

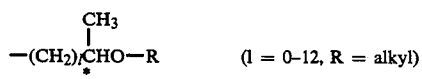  (l = 0–12, R = alkyl)

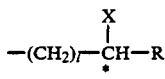  (l = 0–12, R = alkyl, X = halogen, cyano group or trifluoromethyl group)

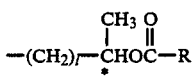  (l = 0–12, R = alkyl)

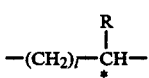  (l = 0–12, R = alkyl, aralkyl)

and also having (ii) the following groups as a central group in terms of core structure:

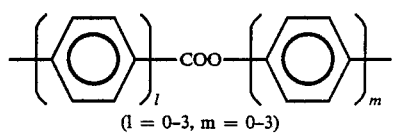

(l = 0–3, m = 0–3)

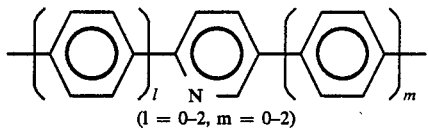

(l = 0–2, m = 0–2)

(l = 1–3)

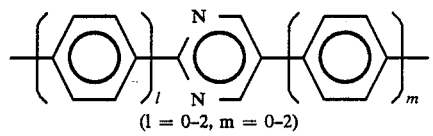

(l = 0–2, m = 0–2)

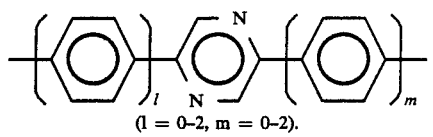

(l = 0–2, m = 0–2).

Further, the compounds may have groups having the six-membered ring(s) of the above core structure substituted by halogen, cyano group or alkyl group at the lateral position thereof, or they may have groups having the above central group linked by a divalent groups such as —COO—, —OCO—, —CH₂O—, —OCH₂—, —CH₂CH₂—, —CH=CH—, —CH=N—, —N=CH—, —N=N—,

etc.

Concrete examples of optically active substances preferably used as a component of the ferroelectric liquid crystal mixture of the present invention and literature disclosing the substances are as follows:

(Japan. Pat. Appln. laid-open No. Sho 59-118744/1984)
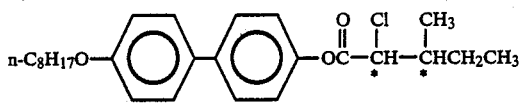
(Japan. Pat. Appn. laid-open No. Sho 60-218358/1985)
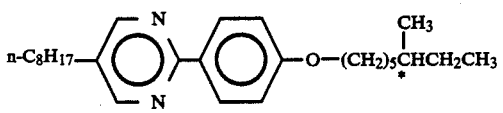
(Japan. Pat. Appln. laid-open No. Sho 60-260564/1985)
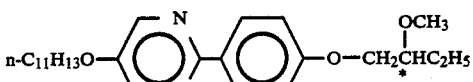
(12th Liquid Crystal Forum, preprints, 2F13)
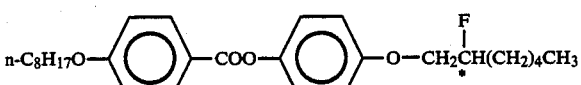
(12th Liquid Crystal Forum, preprints, 2F11)
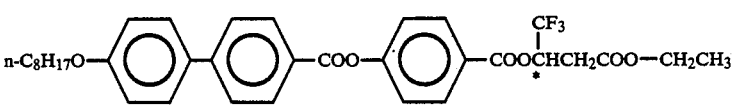
(Chemistry Express Vol. 2, No. 1. pp 53~56(1987))
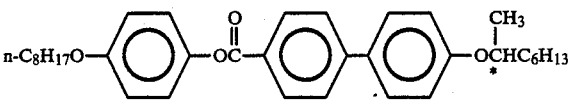
(Japan. Pat. Appln. laid-open No. Sho 61-43/1986)
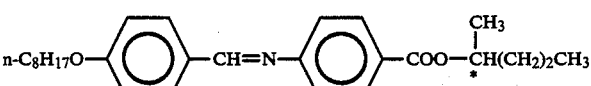
(Ferroelectrics 58, 21(1984))
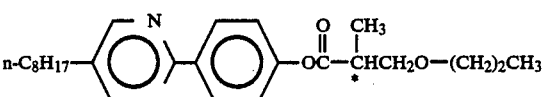
(Japan. Pat. Appln. laid-open No. Sho 61-44845/1986)
(Japan. Pat. Appln. No. Sho 61-133269/1986)
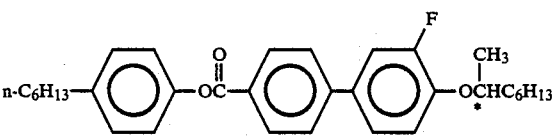
(Japan. Pat. Appln. laid-open No. Sho 61-210056/1986)

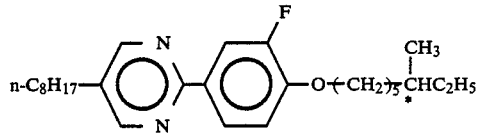
(Japan. Pat. Appln. laid-open No. Sho 62-169765/1987)

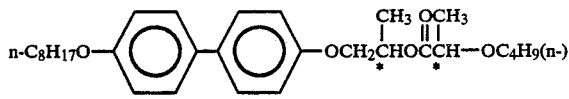
(Japan. Pat. Appln. No. Sho 62-49796/1987)

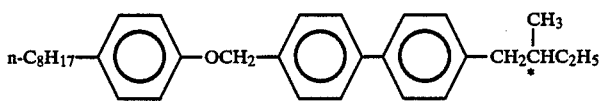
(Japan. Pat. Appln. laid-open No. Sho 61-63633/1886)

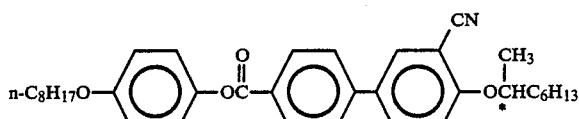
(Japan. Pat. Appln. laid-open No. Sho 63-48254/1988)

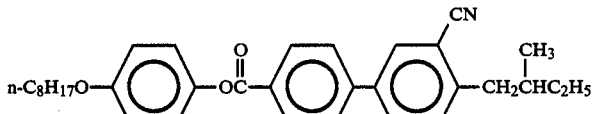
(Japan. Pat. Appln. No. Sho 62-67097/1987)

The liquid crystal compound used as a component of smectic liquid crystal mixtures of the present invention and expressed by the formula (I) and having an Sc phase is a novel compound, and may be prepared through the following route:

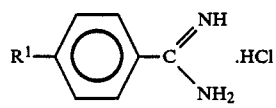
(1)

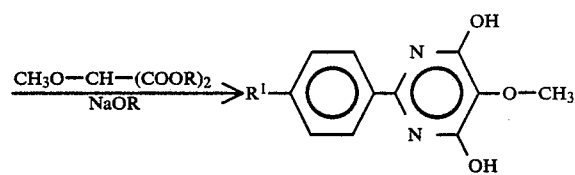
(2)

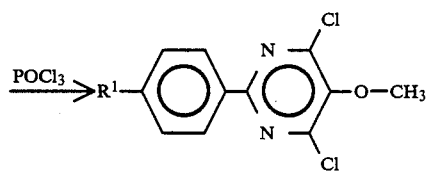
(3)

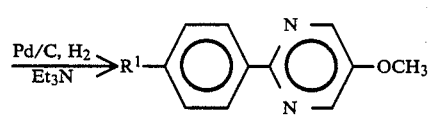
(4)

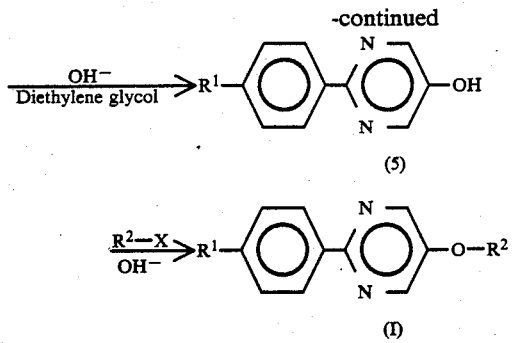

In the above equations, R represents an alkyl group such as methyl, ethyl, etc. and X represents a group to be eliminated such as Cl, Br, I, p-toluenesulfonyloxy group, benzenesulfonyloxy group, methanesulfonyl group, etc.

Namely, a p-alkylbenzamidine hydrochloride (1) is reacted with a methoxymalonic acid diester in the presence of a sodium alcoholate to obtain a diol (2), which is halogen-substituted by means of a halogenating agent such as phosphorus oxychloride to obtain a compound (3), which is dehalogenated in the presence of a base to obtain a compound (4), which is heat-treated in diethylene glycol in the presence of an alkali to obtain a compound (5), which is etherified to obtain the objective compound of the formula (I)

Further, it is also possible to prepare the compound of the formula (I) through the following route:

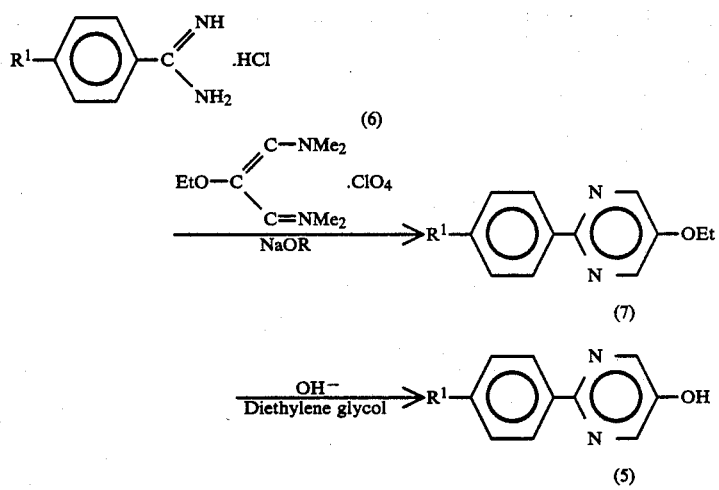

In the above equations, $R^1$ is as defined above.

Namely, a p-alkylbenzamidine hydrochloride (1) is reacted with a compound (6) disclosed in Collection Czechoslov. Chem. Commun., 38, (1973), 1168 in the presence of a sodium alcoholate to prepare a compound (7), which is treated with an alkali to obtain a compound (5). The alternate reaction is carried out in the same manner as in the first route. The p-alkyl-benzamidine hydrochloride as the starting substance may be prepared from easily commercially available p-alkylbenzonitrile in a conventional manner.

Further, the compound of the formula (II) may be prepared according to the process disclosed in West German patent publication No. DT-2257588.

Further, the compound of the formula (III) may be prepared according to the process disclosed in Japanese patent publication No. Sho 62-5434/1987, or through a preparation route similar to the above illustrated route.

The present invention is based on the finding of the superior specific features of the smectic C liquid crystal expressed by the formula (I). The superior specific features are directly illustrated in comparison of Example 3 with Comparative example 1 each described later. Namely, a ferroelectric liquid crystal material obtained from a smectic C liquid crystal of the formula (I) and an optically active compound (see Example 3) has realized a high response rate which is three times that of a ferroelectric liquid crystal material obtained from a smectic C liquid crystal of the formula (II), which material has so far been regarded as affording superior response properties (see Comparative example 3).

Among the spontaneous polarization value (abbreviated as Ps) of ferroelectric liquid crystal materials, the viscosity (abbreviated to $\eta$) and the response time (abbreviated to $\tau$) thereof, there is a relation of $$\tau = \frac{\eta}{Ps \cdot E}$$

wherein E represents an electric field intensity impressed to a liquid crystal cell. This indicates that a ferroelectric liquid crystal material having a low viscosity and a large spontaneous polarization value has been earnestly desired in the aspect of response properties.

It is seen from comparison of the results of Example 3 with those of Comparative example 1 described later that the smectic C liquid crystal compound of the formula (I) has a low viscosity to the same extent as that of the viscosity of the smectic C liquid crystal compound of the formula (II) so far used as a component of smectic base mixtures having a low viscosity. And yet a merit that a ferroelectric liquid crystal material using the smectic liquid crystal of the formula (I) has a large spontaneous polarization value has been shown. Further, due to this large spontaneous polarization value, a high response rate as shown in Examples has been realized. It has been suggested in West German patent publication No. DT 2257588 that compounds abundant in nematic properties among the compounds expressed by the formula (I) are used as a component of nematic liquid crystal mixtures, but it has never been disclosed in prior literature including the above-mentioned publication that smectic C liquid crystals are present among the compounds of the formula (I) and also the smectic C liquid crystals are used for smectic base mixtures of ferroelectric liquid crystal materials. It has been found by the present inventors for the first time that when compounds expressed by the formula (I) and having smectic C phase or mixtures thereof are mixed with optically active compounds, the resulting mixtures constitute ferroelectric liquid crystal materials having a very large Ps value.

The specific feature of the smectic liquid crystal of the formula (I) that the Ps value of the resulting ferroelectric liquid crystal mixture is notably increased and the specific feature of the low viscosity of the compound of the formula (II) function well with each other to afford a desired smectic base mixture.

The compound of the formula (III) has Sc phase within a relatively high temperature region in addition its low viscosity; hence when the compound is mixed with the smectic liquid crystal of the formula (I), it is possible to obtain a chiral smectic liquid crystal having a broad Sc phase range and a large Ps value. Other effects of the present invention will be illustrated in the following the examples.

In Examples, the phase transition point was sought by a differential scanning calorimeter (DSC) and by observing the texture of smectic liquid crystal mixtures by means of a polarizing microscope. Further the response time was sought from a change in the intensity of transmitted light formed by placing a liquid crystal element between two crossed polarizing plates and impressing a square wave of ±10 V and 100 Hz thereto. The spontaneous polarization value was sought according to Sawyer-Tower method.

Further, in Examples, the percentage is by weight and the phase transition point is by °C.

EXAMPLE 1

A smectic liquid crystal mixture A consisting of the following five liquid crystal compounds belonging to the formula (I) and having smectic C phase:
5-hexyloxy-2-(4-octylphenyl)pyrimidine 10%
5-dodecyloxy-2-(4-octylphenyl)pyrimidine 20%
5-tridecyloxy-2-(4-octylphenyl)pyrimidine 20%
5-tetradecyloxy-2-(4-octylphenyl)pyrimidine 20%
5-pentadecyloxy-2-(4-octylphenyl)pyrimidine 20%,
and a liquid crystal compound exhibiting no Sc phase,
5-hexyloxy-2-(4-hexylphenyl)pyrimidine 10%
was prepared.

The phase transition points of this mixture A were as follows:

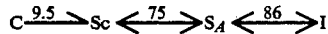

wherein C and I represent a crystalline phase and isotropic liquid phase, respectively.

EXAMPLE 2

With the smectic liquid crystal mixture A (60%) prepared in Example 1 were mixed the following two liquid crystal compounds having ferroelectric Sc* phase (each 20%) to prepare a ferroelectric smectic liquid crystal mixture B:

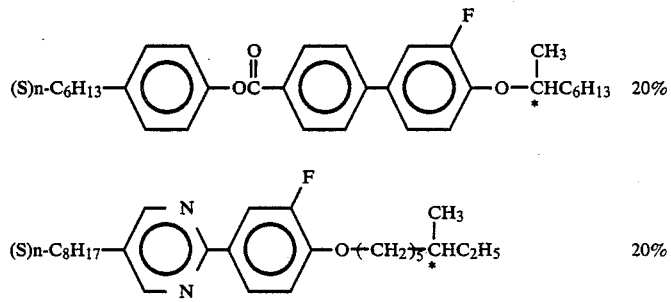

The phase transition points of this liquid crystal mixture B were as follows

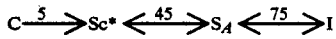

This mixture B was filled in a cell of 2 μm thickness provided with transparent electrodes each obtained by coating the surface with polyvinyl alcohol as an aligning agent and rubbing the resulting surface to subject it to a parallel aligning treatment to thereby prepare a liquid crystal element. This element was placed between two crossed polarizing plates and a square wave of 100 Hz and ±10 V was impressed thereto. As a result, a change in the intensity of transmitted light was observed. The response time sought from the change in the intensity of transmitted light and the spontaneous polarization value sought according to the Sawyer-Tower method were 65 μsec and 10.4 nC/cm² at 25° C., respectively.

EXAMPLE 3

A chiral smectic liquid crystal mixture C consisting of a liquid crystal compound belonging to the formula (I) and having a smectic C phase i.e. 5-octyloxy-2-(4-hexylphenyl)pyrimidine (80%) and a ferroelectric liquid crystal compound (20%) expressed by the formula (Compound a)

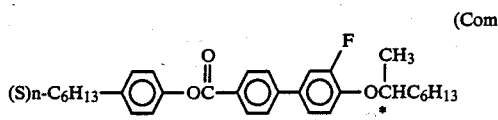

was prepared. The phase transition points of this liquid crystal mixture C were as follows:

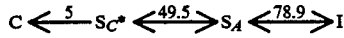

Further, with the mixture C, the spontaneous polarization value and the response time of the resulting liquid crystal cell each sought at indicated temperatures in the same manner as in Example 2 are shown in Table 1.

TABLE 1

| Temperature (°C.) | Response time (μsec) | Spontaneous polarization (nC/cm$^2$) |
|---|---|---|
| 40 | 40 | 9.4 |
| 30 | 50 | 12.3 |
| 20 | 70 | 14.7 |
| 10 | 100 | |

COMPARATIVE EXAMPLE 1

Using a liquid crystal belonging to the formula (II) and having smectic C phase i.e. 5-octyl-2-(hexyloxyphenyl)-pyrimidine in place of 5-octyloxy-2-(4-hexylphenyl)-pyrimidine in Example 3, a ferroelectric liquid crystal mixture D was prepared, and the phase transition, spontaneous polarization and response properties were measured in the same manner as in Example 3. The results are shown below.

5 wherein Ch refers to cholesteric phase.

TABLE 2

| Temperature (°C.) | Response time (μsec) | Spontaneous polarization (nC/cm$^2$) |
|---|---|---|
| 40 | 105 | 3.8 |
| 30 | 145 | 4.7 |
| 20 | 220 | 4.7 |

EXAMPLE 4

An equal weight mixture (referred to as mixture E) consisting of smectic C liquid crystal compounds each belonging to the formula (I) i.e. 5-heptyloxy-2-(4-hexylphenyl)pyrimidine and 5-octyloxy-2-(4-hexylphenyl)-pyrimidine was prepared. The phase transition points of the mixture E were as follows:

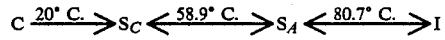

Next, a liquid crystal mixture F consisting of the mixture E (80%) and the liquid crystal compound (compound a) used in Example 3 (20%) was prepared. The phase transition points of the liquid mixture F were as follows:

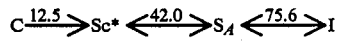

EXAMPLE 5

A chiral smectic liquid crystal mixture G consisting of a compound of the formula (I), a compound of the formula (III) and four optically active compounds and having the following composition was prepared:

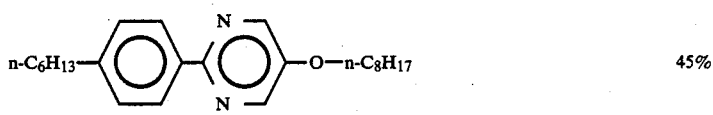 45%

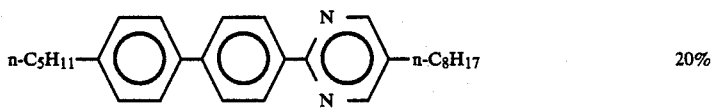 20%

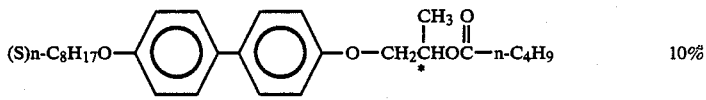 10%

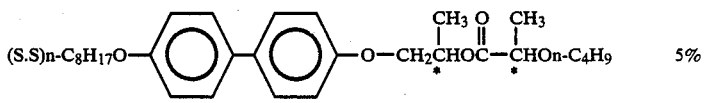 5%

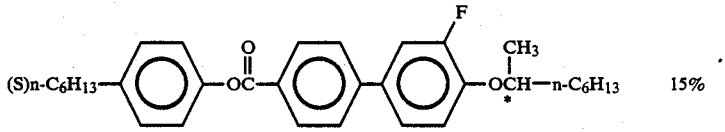 15%

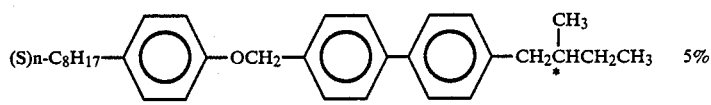 5%

The phase transition points of this mixture G were as follows:

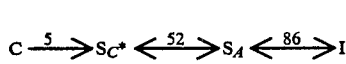

Further, the response time and spontaneous polarization value sought in the same manner as in Example 2 are shown in Table 3.

TABLE 3

| Temperature (°C.) | Response time (μsec) | Spontaneous polarization (nC/cm$^2$) |
|---|---|---|
| 40 | 25 | 9.4 |
| 30 | 30 | 22.7 |
| 20 | 50 | |
| 10 | 74 | |
| 0 | 158 | |

EXAMPLE 6

A liquid crystal mixture H shown below was prepared in the same manner as in the above Example.

The phase transition points of the mixture H were as follows:

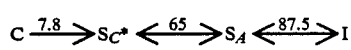

The response time and spontaneous polarization value measured in the same manner as in Example 2 are shown in Table 4.

TABLE 4

| Temperature (°C.) | Response time (μsec) | Spontaneous polarization (nC/cm$^2$) |
|---|---|---|
| 50 | 50 | 5.7 |
| 40 | 60 | 11.8 |
| 30 | 75 | 20.3 |
| 20 | 120 | 26.0 |
| 10 | 215 | |

EXAMPLE 7

A mixture J consisting of equal weights of 5-octyloxy-2-(4-octylphenyl)pyrimidine belonging to the

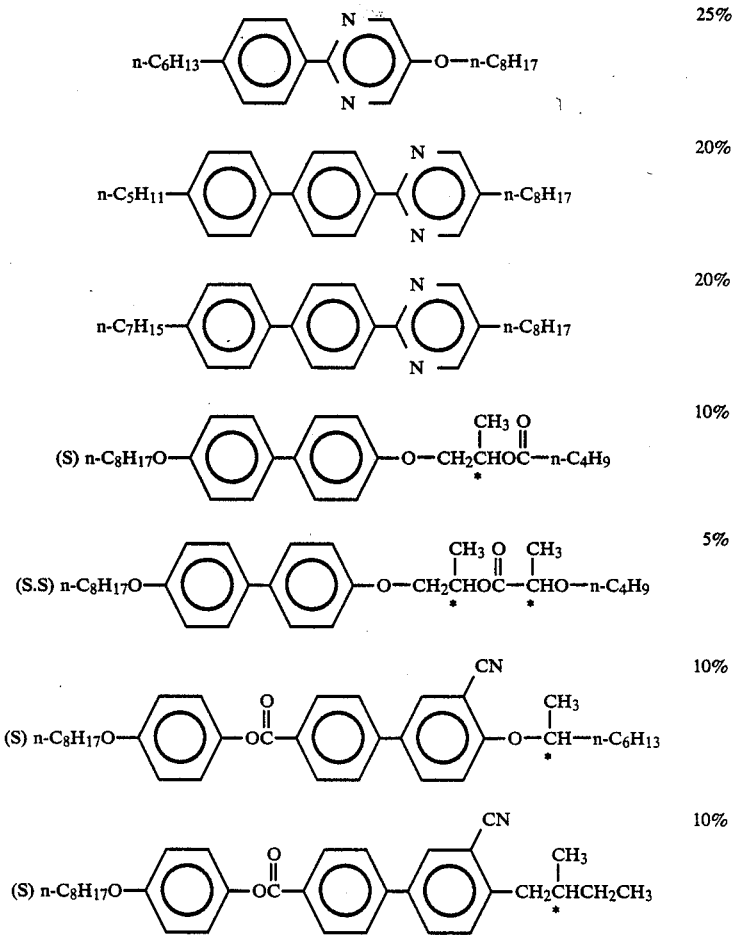

formula (I) and 5-octyl-2-(4-octyloxyphenyl)pyrimidine belonging to the formula (II) exhibited the following phase transition points:

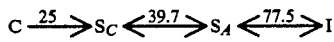

EXAMPLES 8 TO 10

Using compounds of the formula (I) and compounds of the formula (III), the following three smectic liquid crystal mixtures K, L and M, respectively, were prepared and the compositions and phase transition points thereof are shown below:

Smectic mixture K:

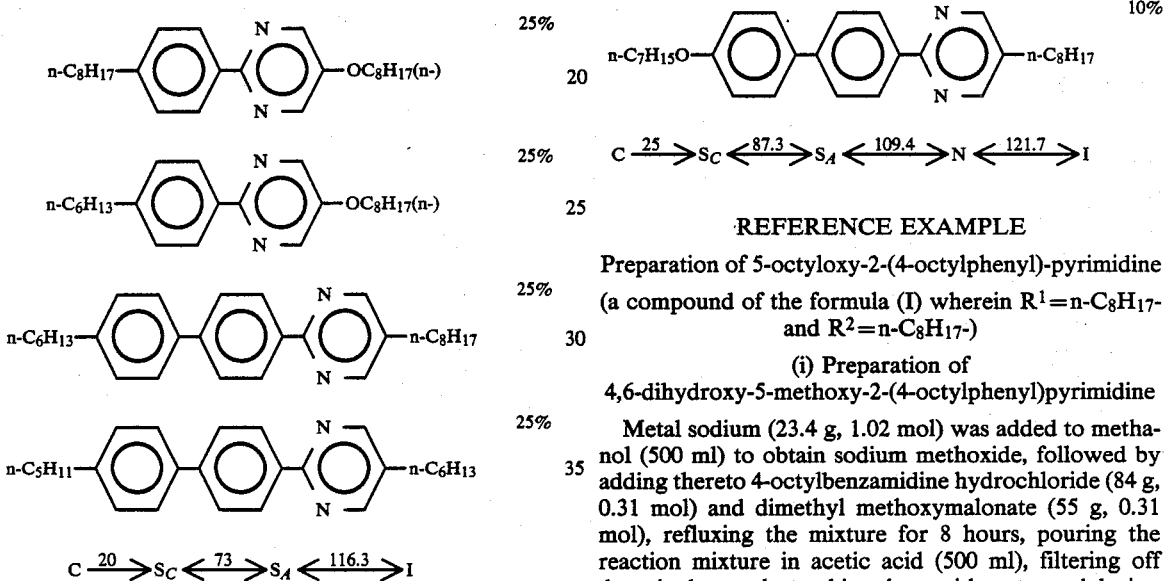

Smectic mixture L:

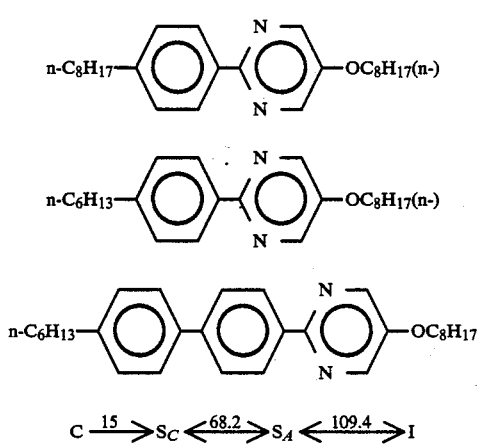

Smectic mixture M:

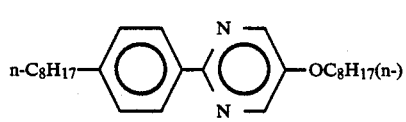

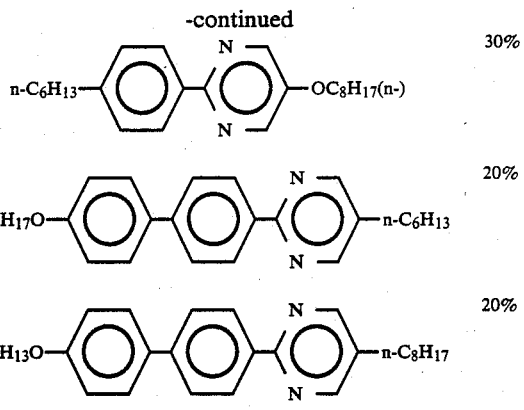

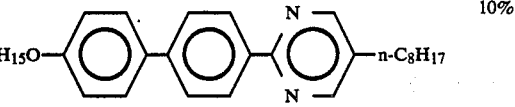

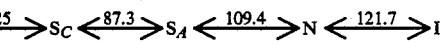

REFERENCE EXAMPLE

Preparation of 5-octyloxy-2-(4-octylphenyl)-pyrimidine (a compound of the formula (I) wherein $R^1$=n-$C_8H_{17}$- and $R^2$=n-$C_8H_{17}$-)

(i) Preparation of 4,6-dihydroxy-5-methoxy-2-(4-octylphenyl)pyrimidine

Metal sodium (23.4 g, 1.02 mol) was added to methanol (500 ml) to obtain sodium methoxide, followed by adding thereto 4-octylbenzamidine hydrochloride (84 g, 0.31 mol) and dimethyl methoxymalonate (55 g, 0.31 mol), refluxing the mixture for 8 hours, pouring the reaction mixture in acetic acid (500 ml), filtering off deposited crystals, washing them with water and drying to obtain 4,6-dihydroxy-5-methoxy-2-(4-octylphenyl)-pyrimidine (91.5 g).

(ii) Preparation of 4,6-dichloro-5-methoxy-2-(4-octylphenyl)pyrimidine

To 4,6-dihydroxy-5-methoxy-2-(4-octylphenyl)-pyrimidine (91.5 g, 0.28 mol) were added phosphorus oxychloride (258 g, 1.68 mol) and N,N-diethylaniline (46 g, 0.31 mol), followed by refluxing the mixture for 30 hours, distilling off excess phosphorus oxychloride under reduced pressure, dissolving the residue in toluene, sufficiently washing the solution with 2N—NaOH aqueous solution, further washing it with water, distilling off toluene and recrystallizing the residue from a mixed solvent of ethanol (280 ml) with ethyl acetate (10 ml) to obtain 4,6-dichloro-5-methoxy-2-(4-octylphenyl)pyrimidine in the form of colorless acicular crystals (74.2 g) (m.p.:36.8°–37.9° C.).

(iii) Preparation of 5-methoxy-2-(4-octylphenyl)-pyrimidine

To 4,6-dichloro-5-methoxy-2-(4-octylphenyl)pyrimidine (74.2 g, 0.202 mol) were added ethanol (310 ml), water (15.5 ml), 5% Pd-activated carbon (5.7 g) and triethylamine (61.3 g, 0.606 mol), followed by agitating the mixture at about 40° C. in hydrogen current, filtering off the Pd-activated carbon, adding toluene, sufficiently washing the mixture with 2N—NaOH aqueous solution, further washing it with water, distilling off toluene and recrystallizing the residue from ethanol (70 ml) to obtain 5-methoxy-2-(4-octylphenyl)pyrimidine in the form of colorless acicular crystals (54.9 g) having a m.p. of 40.1°–41.8° C.

(iv) Preparation of 5-hydroxy-2-(4-octylphenyl)pyrimidine

To 5-methoxy-2-(4-octylphenyl)pyrimidine (53.9 g, 0.18 mol) were added diethylene glycol (500 ml) and NaOH (43.4 g, 1.08 mol), followed by agitating the mixture at about 200° C. for 2 hours, pouring the resulting material in acetic acid (700 ml), collecting deposited crystals and recrystallizing the crystals from a mixed solvent of heptane (100 ml) with ethyl acetate (10 ml) to obtain 5-hydroxy-2-(4-octylphenyl)pyrimidine (45.2 g) (m.p.:147.3°–148.7° C.).

(v) Preparation of the captioned compound

To 5-hydroxy-2-(4-octylphenyl)pyrimidine (5 g, 0.018 mol) were added ethanol (50 ml), octyl iodide (12.6 g, 0.053 mol) and diazabicyclo[5.4.0]undec-7-ene (0.053 mol), followed by refluxing the mixture for 4 hours, dissolving the reaction mixture in toluene, sufficeiently washing the solution with 2N—NaOH aqueous solution, further washing it with water, distilling off toluene and recrystallizing the residue from ethanol (75 ml) to obtain 5-octyloxy-2-(4-octylphenyl)pyrimidine (5 g). This product exhibited liquid crystalline properties and its phase transition points were as follows:

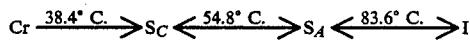

We claim:

1. A smectic C liquid crystal mixture comprising at least two components at least one of which is a 5-alkoxy-2-(4-alkylphenyl)pyrimidine compound expressed by the formula

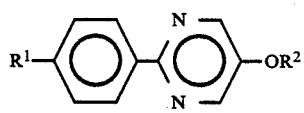

wherein $R^1$ represents a linear alkyl group of 4 to 20 carbon atoms and $R^2$ represents a linear alkyl group of 7 to 20 carbon atoms, and having a smectic C phase.

2. A smectic C liquid crystal mixture comprising at least one 5-alkoxy-2-(4-alkylphenyl)pyrimidine compound expressed by the formula

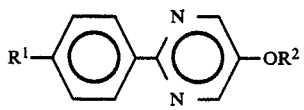

wherein $R^1$ represents a linear alkyl group of 4 to 20 carbon atoms and $R^2$ represents a linear alkyl group of 7 to 20 carbon atoms, and having a smectic C phase; and at least one 5-alkyl-2-(4-alkoxyphenyl)pyrimidine compound expressed by the formula

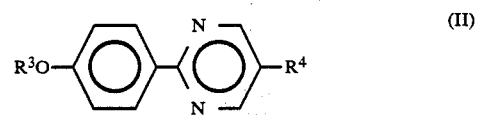

wherein $R^3$ represents a linear alkyl group of 6 to 12 carbon atoms and $R^4$ represents a linear alkyl group of 8 to 11 carbon atoms and having a smectic C phase.

3. A smectic C liquid crystal mixture comprising at least one 5-alkoxy-2-(4-alkylphenyl)pyrimidine compound expressed by the formula

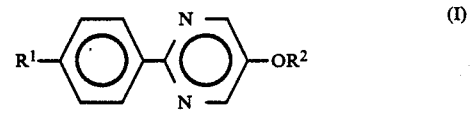

wherein $R^1$ represents a linear alkyl group of 4 to 20 carbon atoms and $R^2$ represents a linear alkyl group of 7 to 20 carbon atoms, and having a smectic C phase; and at least one biphenylpyrimidine compound expressed by the formula

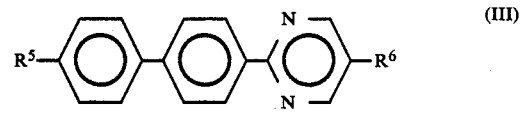

wherein $R^5$ and $R^6$ each represent the same or different linear alkyl group or alkoxy group each of 1 to 18 carbon atoms.

4. A ferroelectric smectic C liquid crystal mixture comprising at least one 5-alkoxy-2-(4-alkylphenyl)-pyrimidine compound expressed by the formula

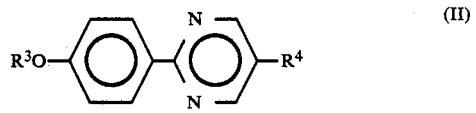

wherein $R^1$ represents a linear alkyl group of 4 to 20 carbon atoms and $R^2$ represents a linear alkyl group of 7 to 20 carbon atoms, and having a smectic C phase; and at least one optically active compound.

5. A ferroelectric smectic C liquid crystal mixture comprising at least one 5-alkoxy-2-(4-alkylphenyl)-pyrimidine compound expressed by the formula

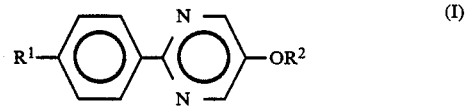

wherein $R^1$ represents a linear alkyl group of 4 to 20 carbon atoms and $R^2$ represents a linear alkyl group of 7 to 20 carbon atoms, and having a smectic C phase; at least one 5-alkyl-2-(4-alkoxyphenyl)pyrimidine compound expressed by the formula

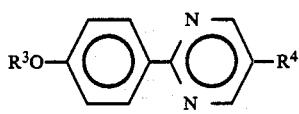

wherein $R^3$ represents a linear alkyl group of 6 to 12 carbon atoms and $R^4$ represents a linear alkyl group of 8 to 11 carbon atoms and having a smectic C phase; and at least one optically active compound.

6. A ferroelectric smectic C liquid crystal mixture comprising at least one 5-alkoxy-2-(4-alkylphenyl)-pyrimidine compound expressed by the formula

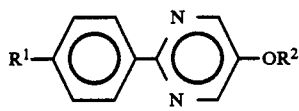

wherein $R^1$ represents a linear alkyl group of 4 to 20 carbon atoms and $R^2$ represents a linear alkyl group of 7 to 20 carbon atoms, and having a smectic C phase; at least one biphenylpyrimidine compound expressed by the formula

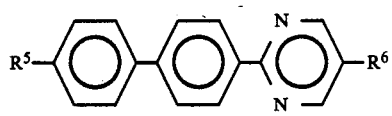

wherein $R^5$ and $R^6$ each represent the same or different linear alkyl group or alkoxy group each of 1 to 18 carbon atoms;
at least one optically active compound.

7. A liquid crystal display element containing a ferroelectric smectic C liquid crystal mixture comprising at least one 5-alkoxy-2-(4-alkylphenyl)pyrimidine compound expressed by the formula

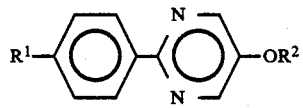

wherein $R^1$ represents a linear alkyl group of 4 to 20 carbon atoms and $R^2$ represents a linear alkyl group of 7 to 20 carbon atoms, and having a smectic C phase, and at least one optically active compound.

8. A liquid crystal display element containing a ferroelectric smectic C liquid crystal mixture comprising at least one 5-alkoxy-2-(4-alkylphenyl)pyrimidine compound expressed by the formula

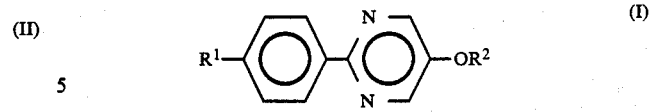

wherein $R^1$ represents a linear alkyl group of 4 to 20 carbon atoms and $R^2$ represents a linear alkyl group of 7 to 20 carbon atoms, and having a smectic C phase; at least one 5-alkyl-2-(4-alkoxyphenyl)pyrimidine expressed by the formula

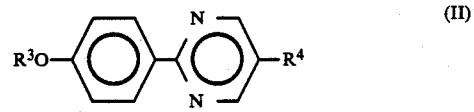

wherein $R^3$ represents a linear alkyl group of 6 to 12 carbon atoms and $R^4$ represents a linear alkyl group of 8 to 11 carbon atoms and having a smectic C phase; and at least one optically active compound.

9. A liquid crystal display element containing a ferroelectric smectic C liquid crystal mixture comprising at least one 5-alkoxy-2-(4-alkylphenyl)pyrimidine compound expressed by the formula

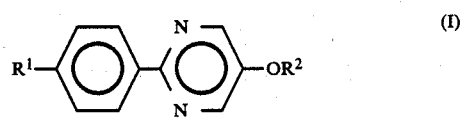

wherein $R^1$ represents a linear alkyl group of 4 to 20 carbon atoms and $R^2$ represents a linear alkyl group of 7 to 20 carbon atoms, and having a smectic C phase; at least one biphenylpyrimidine compound expressed by the formula

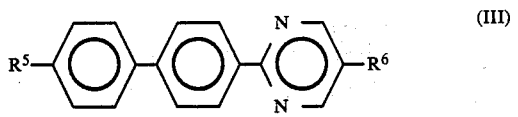

wherein $R^5$ and $R^6$ each represent the same or different linear alkyl group or alkoxy group each of 1 to 18 carbon atoms;
and at least one optically active compound.

10. A smectic C liquid crystal mixture according to claim 3 wherein $R^5$ and $R^6$ contain 5 to 10 carbon atoms.

11. A smectic C liquid crystal mixture according to claim 3 wherein said at least one biphenylpyrimidine compound has a smectic C phase.

12. A ferroelectric smectic C liquid crystal mixture according to claim 6 wherein $R^5$ and $R^6$ contain 5 to 10 carbon atoms.

13. A ferroelectric smectic C liquid crystal mixture according to claim 6 wherein said at least one biphenylpyrimidine compound has a smectic C phase.

14. A liquid crystal display element according to claim 9 wherein $R^5$ and $R^6$ contain 5 to 10 carbon atoms.

15. A liquid crystal display element according to claim 9 wherein said at least one biphenylpyrimidine compound has a smectic C phase.

* * * * *